April 10, 1962
M. U. BAGWELL ET AL
3,028,744
PROCESS AND APPARATUS FOR CALIBRATING A
LARGE CAPACITY FLUID FLOW METER
Filed July 3, 1958
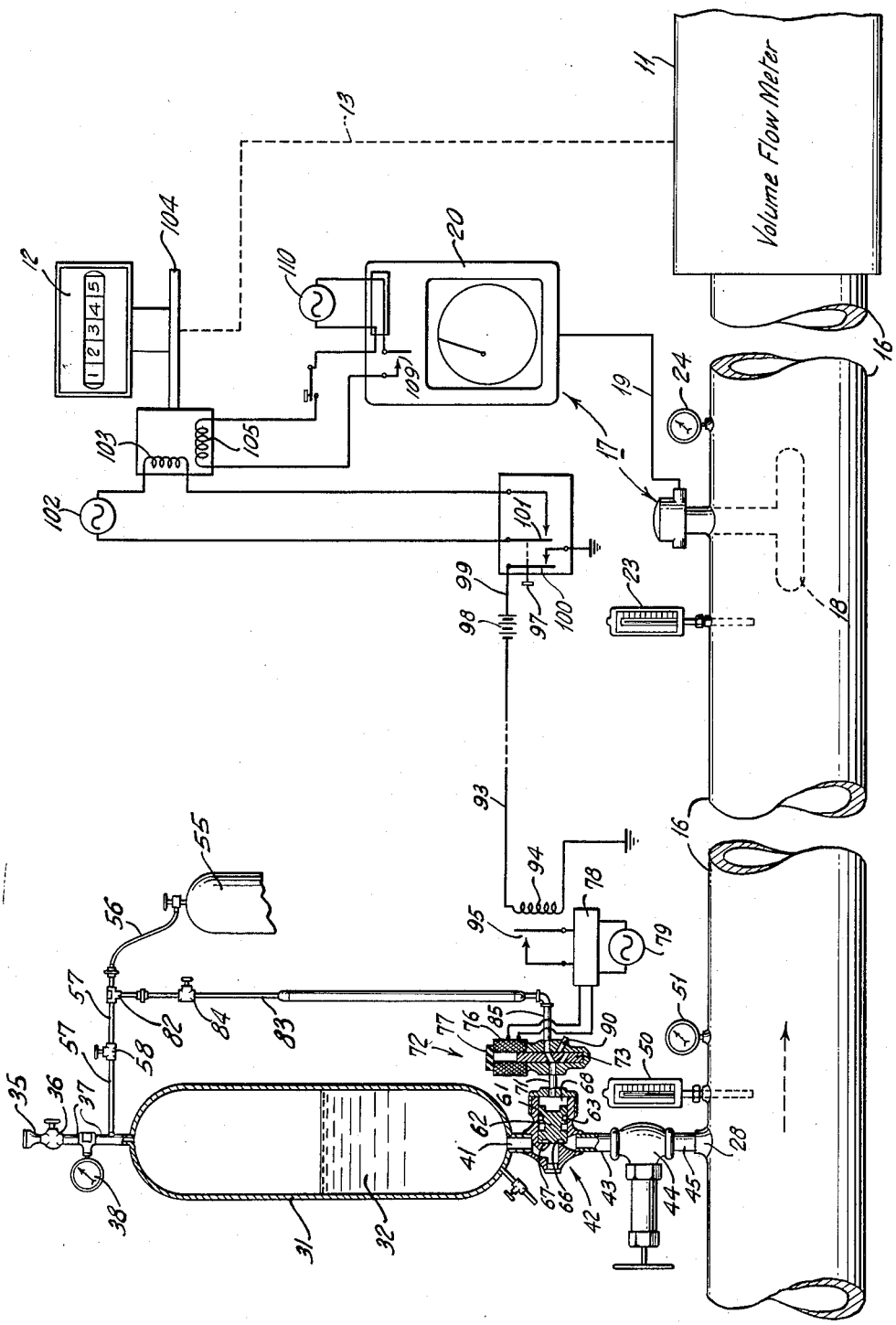

United States Patent Office 3,028,744
Patented Apr. 10, 1962

3,028,744
PROCESS AND APPARATUS FOR CALIBRATING A LARGE CAPACITY FLUID FLOW METER
Marshall U. Bagwell and Donald H. Bond, Houston, Tex., assignors to The Texas Pipe Line Company, Houston, Tex., a corporation of Texas
Filed July 3, 1958, Ser. No. 746,529
6 Claims. (Cl. 73—3)

This invention is concerned with a method and system for calibrating, or proving, a volumetric flow meter. More specifically, it involves the introducing of a tracer slug of different dielectric material into a pipe line at a predetermined location, upstream from the meter that is to be calibrated, or proved. Then, having read the meter at the time that such slug was introduced, the arrival of the slug downstream a measured distance is determined; and the reading of the meter at that time is again taken in order to determine the meter indication of the quantity of fluid that has passed through the line. Since a measured length of pipe line contains a known volume of fluid, the volume indication of the meter may be compared to the known volume; and calibration, or proving, of the meter is thus had.

Heretofore, the arrangements employed for calibrating or proving meters, in large diameter pipe line operations, have involved the use of proving tanks to measure the quantity of fluid that has passed through the line during a predetermined metering run. As indicated, this method involved the use of proving tanks; and such tanks have become extremely large and costly, especially so in the applications where large diameter pipe lines are employed.

One attempt to overcome the expense, and waste space problems, that are incident to the use of proving tanks, has been the employment of a solid plug inserted into the pipe line, for measuring the flow of a predetermined length of pipe line fluid by sensing the passage of the plug at two points a measured distance apart along the line. However, there are drawbacks in such a system, in that, in addition to the need for launching equipment to accelerate the plug and put it into the flowing fluids of a pipe line, such plug has considerable friction during its passage through the pipe line, and particular care must be taken to see that the pipe joints are smooth. Furthermore, the friction of the plug causes a quantity of the pipe line fluid to by pass or bleed around the plug, and this introduces an error in the results. These and other conditions create factors which are not encountered during metering runs through the pipe line under normal circumstances, and consequently when calibration or proving are being carried out there are additional factors to be accounted for, which render the calibration less reliable.

Another suggestion for eliminating the use of proving tanks, has been to the effect that radioactive tracer material might be employed for measuring a predetermined length of flow through the line. This suggested procedure has difficulties and also drawbacks. Among these are the facts that there is danger to personnel in handling radioactive materials, and in addition clearance must be had from government authorities, plus the fact that the materials themselves are relatively expnsive.

Consequently, it is an object of this invention to overcome the difficulties mentioned above.

Another object of this invention is to provide an improved method of calibrating a large diameter flow meter, by employing a dielectric tracer which has a dielectric constant that is appreciably different from the dielectric constant of the fluid in the pipe line. In addition it is contemplated that such dielectric tracer material should be miscible with the fluid in the pipe line.

It is another object of this invention to provide an improved system for calibrating a volumetric type of flow meter that employs a dielectric material tracer slug, while employing quick injection of such slug into the flowing pipe line fluid. Such slug of tracer material should be miscible with the pipe line fluid that is being measured, and it should have an appreciably different dielectric constant from the pipe line fluid in order that it may be detected upon its arrival downstream.

Still another object of this invention is to provide a system for calibrating a volumetric flow meter that employs, a dielectric material tracer and provides for a relatively instantaneous injection of a slug of miscible fluid that has an appreciably different dielectric constant from the fluid in the pipe line. The volume of such slug of tracer material should be about the same as that volume of fluid measured by a short section of the pipe line between about one and three diameters long.

Briefly, the invention concerns a method to be employed in a process for calibrating a large capacity flow meter, through which a measured quantity of fluid is passed. Wherein the process includes the step of determining the volumetric meter readings at the beginning and end of said measured quantity of fluid. The method comprises the steps of, injecting a slug of miscible fluid having a dielectric constant substantially different from the dielectric constant of said quantity of fluid, into the fluid upstream a predetermined distance from a dielectric change detector; and simultaneously determining the reading of said meter at the downstream end of said measured quantity of fluid. The method also comprises the steps of, detecting the arrival of said slug at said dielectric change detector, and determining the reading of said meter at the time of arrival of said slug, in order to compare the difference in meter readings with the predetermined known volume of fluid.

Also the invention may be briefly described as encompassing a system in combination with a measured length of pipe line. The pipe line has fluid-slug injecting means at the upstream end of said length of line, and it has means for detecting the arrival of said slug at the downstream end of said length of line. The system is concerned with means for calibrating a volumetric flow meter, and such means comprises means for simultaneously injecting said fluid slug into the line, plus means for connecting an indicator to said meter. The system also comprises means responsive to said detecting means, for disconnecting said indicator from said meter. The said slug aforementioned, being a miscible fluid with the fluid in said pipe line and having a dielectric constant that is measurably different from the dielectric constant of said pipe line fluid.

The foregoing and other objects and benefits of the invention are set forth in greater detail below, and are illustrated in the drawing, in which:

The FIGURE of the drawings illustrates a schematic showing of a complete system for carrying out flow meter calibration, or proving, according to the invention.

Referring to the figure of the drawings, it will be observed that there is a volumetric type flow meter 11, indicated schematically as a rectangle with caption. The flow meter 11 has an indicator 12, connected thereto by means of a mechanical connection 13 (indicated by a dashed line).

The flow meter 11 is connected into a pipe line 16 to measure the flow of fluid therein. The pipe line is illustrated broken off in two places, indicating that the length thereof between the various elements connected therein, is variable in accordance with the particular installation that may be made, in accordance with the invention.

Located adjacent to flow meter 11, there is a dielectric-constant detector 17, which is a standard instrument that includes a capacitance probe 18 located in the pipe line immersed in the pipe line fluid, and an electrical connection 19 that leads to a recording device 20 for making a continuously recorded indication of the dielectric constant of the fluid in the pipe line 16.

Located adjacent to the detector 17 there is a temperature indicator, or thermometer 23, and a pressure gauge 24. These are both connected into the pipe line 16 to indicate the conditions of the fluid therein at that point.

Located upstream along the pipe line 16 a predetermined measured distance, from the dielectric detector 17, there is a fluid-slug injector located at an inlet connection 28 in the pipe line.

Of course the size of the pipe line may vary to fit the particular circumstances, but in a particular embodiment upon which this description is based, the pipe line section 16 that is illustrated is over two miles long between inlet 28 and detector 17 (probe 18), and consists of a sixteen inch line. Consequently the calculated volume of the pipe line between these two points, figures out to be approximately 3,429 barrels.

The injector that is connected to inlet connection 28, may take various forms but it is preferred to employ one in accordance with the illustration, wherein there is provided a pressure tank 31 that is partially filled with a predetermined quantity of a tracer-slug fluid 32. The fluid 32 may be introduced at the top of the tank 31, by means of a funnel shaped inlet 35 which is connected by means of a valve 36 and piping 37 to the top of the tank 31. Also connected into the piping 37, there may be a pressure gauge 38 for indicating the gas pressure in the tank 31 above the fluid 32.

The bottom of tank 31 is connected by a relatively large diameter exit opening 41, to a quick opening valve unit 42. The other side of the valve unit 42 is connected via a nipple 43 and a shut-off valve 44 to the inlet connection 28 by means of another nipple 45.

Thus the tracer slug fluid 32 may be injected directly from the tank 31 into the pipe line 16 at inlet connection 28, under control of the quick opening valve unit 42. It will be understood that the isolation valve 44 will be kept open under all normal operating conditions.

Located adjacent to the inlet connection 28 in the pipe line, there is another thermometer 50 and another pressure gauge 51 for determining conditions of the fluid in the pipe line at the upstream end of the measured sections. These pressure and temperature readings are used for adjusting the volumetric flow meter readings given by the indicator 12 of the meter 11.

Injection of the tracer slug material 32 is carried out under pressure by means of having applied to the upper end of the tank 31 a source of gas pressure 55. This gas pressure source 55 may take any feasible form, e.g. a cylinder of nitrogen under pressure. The nitrogen container 55 is connected to the tank 31 by means of standard piping connections which may include a flexible tubing 56 and ordinary pipe, or tubing 57 that joins with the piping 37 at the top of the tank 31. Thus, whenever the valve 36 is closed and a valve 58 in the piping 57 is opened, the source of high pressure gas 55 may be applied directly to the space in tank 31 above the fluid 32.

The quick opening valve unit 42 which controls the injection of the slug-fluid 32 into the pipe line 16, essentially comprises a plug type valve that is actuated by a piston. Thus, there is a cylindrical housing portion 61 of the valve unit 42, which carries therein a piston 62 which has a piston ring 63 near one end for creating a seal to prevent the pressure gas from entering the line with dielectric fluid 32. At the other end of the piston 62, there is a resilient material ring 66 that contacts a valve seat 67 located within the valve unit 42.

Within the housing 61 of the valve unit 42, at the opposite end from the valve seat 67, there is a chamber 68 for receiving gas under pressure to apply closing force to the valve piston 62. This chamber 68 is connected via a pipe 71 to a solenoid-actuated control valve unit 72.

Solenoid valve unit 72 is a standard three way valve. It includes a close fitting slide element 73 that is actuated to move from the illustrated position to one where the gas chamber 68 is vented to the atmosphere. Slide element 73 is actuated by means of a solenoid 76 that acts, when energized, to lift the slide 73 upward against a stop 77. Energization of the solenoid 76 is controlled by means of an electrical timing unit 78 that is connected to a source of electrical energy 79, illustrated.

It will be observed that there is a secondary connection to the source of high pressure gas 55, for actuating the valve unit 42 by means of the piston 62 therein. This auxiliary supply of gas pressure is obtained by means of a T connection 82 and piping 83 that includes a valve 84 and that leads to an inlet connection 85 of the control valve unit 72.

Now it will be clear upon inspection that the operation of the valve 42 is directly controllable by positioning of the slide 73 in control valve unit 72. Thus when the slide 73 is in the lower position, as illustrated in the drawing, gas under pressure from source 55 is applied to the piston 62 of the valve unit 42 so as to maintain the valve tightly closed. Then when the slide 73 of the control valve unit 72 is shifted upward against the stop 77, by means of energization of the solenoid 76, the pipe 71 will be connected directly to an exhaust vent opening, or passage 90 in the control valve unit 72. Therefore the gas pressure that has been holding piston 62 in the closed position, will be released to zero (gauge), and thus the pressure on fluid 32 acting against the plug end of piston 62 will quickly force the piston 62 of the valve 42 to its fully opened position.

Timing unit 78 is a standard device, that acts to energize the solenoid 76 for a predetermined short period of time and de-energize the same thereafter. This timing unit 78 is set to provide an opening of the quick-open valve unit 42 for a predetermined short period, such that a given quantity of the tracer fluid 32 will be injected rapidly under pressure, without allowing any of the gas above the fluid 32 to enter the pipe line 16. Consequently the slug of tracer fluid 32 that is thus injected into the pipe line, may have various volumes depending upon the amount of time and the pressure of the gas in tank 31, etc. However, it is preferred to employ a volume in relationship to the size of the pipe line, such that the volume of fluid 32 injected is on the order of the volume encompassed by a short section of the pipe line about a few diameters long. Thus as a particular example, it has been found quite satisfactory to employ with a sixteen inch pipe line, the injection of a quantity just under five and one half gallons. Furthermore in connection with the same example, it has been found that the injection of this quantity of tracer fluid may be carried out in about three quarters of a second.

It has been found satisfactory to employ a gas pressure in injector tank 31 that is about four hundred pounds per square inch greater than the fluid pressure in the pipe line 16.

It will be appreciated that other sources of gas under pressure than the cylinder 55 indicated, may be employed. For example, a source of compressed air would be quite satisfactory for the injection fluid employed in most instances. A primary consideration as to the kind of gas under pressure that is employed, is the solubility of the gas in the fluid being injected. Clearly the less soluble the better.

The actuation of the timing unit 78 may be carried out remotely by means of a circuit such as that illustrated. There is a D.C. circuit connection 93 that may be part of a telephone circuit. Circuit connection 93 is connected to one end of a relay coil 94, and the other end of the coil is grounded, as illustrated. Relay coil 94 actuates a set of contacts 95 thereof, that are connected to the timing unit 78. Thus whenever contacts 95 are closed, a timing cycle is initiated and the solenoid 76 will be energized for a predetermined period of time. The other end of circuit connection 93 goes to a source of direct current energy 98, and the other side of the source 98 is connected by means of a circuit wire 99 to one side of a push button switch 97 that has a set of contacts 100 therein. The other side of the set of contacts 100 is connected to ground (as illustrated) for completing the circuit. A second set of contacts 101 are mechanically connected to be actuated at the same time as contacts 100. Contacts 101 are connected in circuit with a source of current 102, and they control the energization of a clutch coil 103. Clutch coil 103 acts on a a clutch 104 (schematically illustrated) that, in turn, acts to connect the flow meter 11 with the indicator 12 thereof. The structure of the clutch 104 is so arranged that the indicator 12 will remain connected after coil 103 has been energized, until a second declutching, coil 105 has been energized. Energization of the declutching coil 105 is under control of a relay switch 109 that is in circuit with a source of energy 110. Relay switch 109 is under control of the recording device 20, which is an element of the dielectric detector 17.

All three sources of energy 79, 102 and 110, shown, may be any convenient source, e.g. conventional one hundred and ten volt A.C. power outlets.

*Operation*

In making a calibration run for the flow meter 11, the operation is as follows. After having filled the tank 31 of the injector, with the fluid 32 (which is miscible with and has a dielectric constant appreciably different from that of the fluid in pipe line 16), the calibration run is ready to be performed. To initiate the operation, the push button switch 97 will be closed which closes both sets of contacts 100 and 101 at the same time. The closing of contacts 100 energizes relay coil 94 to close switch contacts 95 and initiate operation of the timing unit 78. Timing unit 78 will then cause the solenoid 76 to be energized for a predetermined short period of time, which will in turn lift the slide element 73 rapidly to its upward position, during this period of time, such that the gas pressure from the chamber 68 behind piston 62 will be vented to the atmosphere. This will cause the quick-opening valve unit 42 to open to its fully open position rapidly, and thus allow fluid 32 to be injected quickly (under the gas pressure applied) into the pipe line 16.

At the same time as this slug of dielectric-material tracer is injected into the pipe line 16, the clutch coil 103 is energized, so that the indicator 12 is connected to the flow meter 11 to begin indicating the flow of pipe line fluid through meter 11. Now when the slug of different dielectrical material 32 arrives at the probe 18 of the dielectric detector 17, the recording device 20 of detector 17 will indicate a change in the dielectric constant of the fluid and at the same time will energize the relay switch 109 that controls the energization of the declutching coil 105 of clutch 104. Consequently, a calibration run will have been completed and the indicator 12 will show what the volume of flow has been, as given by means of the flow meter indication. This volume may then be compared with the calculated volume of fluid contained in the pipe line between the beginning inlet connection 28 and the ending location of the probe 18 of dielectric detector 17.

It is pointed out that the indicated volume of flow, as measured by the flow meter 11, will be corrected for temperature and pressure conditions in the line of pipe line 16. This may be done in accordance with temperature readings and pressure readings as taken at the thermometers 23 and 50, and pressure meters 24 and 51.

It has been discovered that the rate of flow in the pipe line 16 has no noticeable effect on the results. Therefore no account need be taken of the pumping rate during a run.

It is to be noted that during a meter run in accordance with the foregoing description, the time involved in the indicator-connected operation of the meter may encompass a period of about thirty-five minutes, i.e. from introduction of the tracer slug to detection thereof down stream. Therefore the injection time of about three quarters of a second, may be considered as being instantaneous in relation thereto.

Although the dielectric detector 17 that is illustrated, is a standard instrument which is on the market as a capacitance product analyzer, any feasible detector for determining the dielectric constant of the fluid in the pipe line could be employed. The commercial instrument which is illustrated schematically in the drawings, and which has been indicated as being a capacitance product analyzer, employs an electrical bridge circuit in sensing the dielectric constant of the fluid in the pipe line. Thus, the probe 18 is a capacitor, which varies in capacity depending upon the dielectric constant of the fluid that flows therethrough. This capacitor is included as the main element of one arm of an electrical bridge circuit (not shown). Unbalance of the bridge creates current flow that is employed (by means of a pair of polarized relay coils—not shown) so as to actuate desired instrumentalities depending upon the direction of current flow across the diagonal of the bridge circuit. In this case, one of the relays is actuated to energize a motor (not shown) for a given direction of operation. The motor then drives the chart pen for indicating the dielectric constant of the fluid. For use in the system of this invention, one of these polarized relays may be additionally employed to actuate the switch contacts 109, illustrated, so as to energize the declutching coil 105 in accordance with the above description. The sensitivity of the detector 17 may be improved by making an adjustment of the bridge circuit prior to the time when the arrival of dielectric tracer slug 32 is expected, so that the change upon arrival of the slug will be determined quickly with a constant amount of time delay depending upon sensitivity, in each instance.

It has been discovered that it is most desirable to employ a miscible fluid for the slug. The explanation for this is apparently that a non-miscible fluid will either float or sink relative to the fluid in the line so that it fails to be detected upon arrival down stream. It is contemplated that a detector might be employed which could detect the arrival of a non-miscilbe tracer fluid, however. In the latter event, the features and operation of the system in other respects would remain substantially the same as described above.

While a particular embodiment of the invention has been described in considerable detail above in accordance with the applicable statutes, this is not to be taken as in any way limiting the invention but merely as being descriptive thereof.

What is claimed as the invention is:

1. In combination with a measured length of pipe line having a container of tracer slug fluid and fluid slug injecting means at the upstream end of said length of line and having means for detecting the arrival of a slug of said tracer fluid at the down stream end of said length of line, means for calibrating a volumetric flow meter that measures the flow of a fluid in said pipe line comprising means connected to said container for applying injection pressure to said slug fluid that is greater than the pressure of the fluid in said pipe line, quick opening piston actuated valve means for connecting said fluid slug in said container to said pipe line, means for controlling actuation of said piston by applying said injection pressure thereto, means for simultaneously opening said piston actuated valve and connecting an indicator to said meter, and means responsive to said detecting means for disconnecting said indicator from said meter, said slug being a miscible fluid with the fluid in said pipe line and having a dielectric constant measurably different from the dielectric constant of said pipe line fluid.

2. The invention according to claim 1 wherein said means for controlling actuation of said piston includes solenoid actuated valve means for applying or venting said injection pressure to said piston.

3. In combination with a measured length of pipe line having a container of tracer slug fluid and fluid slug injecting means at the upstream end of said length of line and having means for detecting the arrival of a slug of said tracer fluid at the down stream end of said length of line, means for calibrating a volumetric flow meter that measures the flow of a fluid in said pipe line comprising compressed gas supply means connected to said container, for applying injection pressure to said tracer slug fluid that is greater than the pressure of the fluid in said pipe line, a piston actuated plunger type valve connected between said container and said pipe line and having a cylinder and piston for actuating the valve plunger thereof, means for connecting said cylinder to said compressed gas supply for holding said valve closed, means for venting said cylinder for allowing instantaneous full opening of said valve, timing means for reapplying said compressed gas supply to said cylinder after a predetermined time to terminate the injection of said slug without any gas passing into said pipe line, means for simultaneously actuating said venting means and connecting an indicator to said meter, means responsive to said detecting means for disconnecting said indicator from said meter, said slug being a miscible fluid with the fluid in said pipe line and having a dielectric constant measurably different from the dielectric constant of said pipe line fluid.

4. A system for calibrating a large capacity fluid flow meter connected to a pipe line comprising means for injecting into said pipe line a slug of fluid having a dielectric constant measurably different from the dielectric constant of the fluid in said pipe line, said injecting means including means for applying a gas under pressure to said slug fluid, said pressure being much greater than the line pressure of said pipe line, a piston actuated plunger type valve for admitting said slug fluid into the pipe line, said valve plunger having a reduced area exposed to said slug fluid when the valve is closed, means for applying said gas under pressure to said valve piston to hold the valve closed, means for venting said gas under pressure from application to said valve piston in order to rapidly open said valve, timing means for determining the duration of the open condition of said valve to allow said slug of fluid only to enter said pipe line, means actuated by said timing means for controlling the application and venting of said gas under pressure in order to control the position of said valve, dielectric change detection means located a predetermined distance down stream from said injecting means, and means for determining the readings of said meter at the instant of injection of said slug and at the time the dielectric constant of said pipe line fluid changes, in order to calibrate the meter indication without the use of prover tanks or the like.

5. A system for calibrating a large capacity fluid flow meter connected to a pipe line comprising means for injecting into said pipe line a slug of miscible fluid having a dielectric constant measurably different from the dielectric constant of the fluid in said pipe line, said injecting means including means for applying a gas under pressure to said slug fluid, said pressure being much greater than the line pressure of said pipe line, a piston actuated plunger type valve for admitting said slug fluid into the pipe line, said valve plunger having a reduced area exposed to said slug fluid when the valve is closed, means for applying said gas under pressure to said valve piston to hold the valve closed, means for venting said gas under pressure from application to said valve piston in order to rapidly open said valve, timing means for determining the duration of the open condition of said valve to allow said slug of fluid only to enter said pipe line, means actuated by said timing means for controlling the appilcation and venting of said gas under pressure in order to control the position of said valve, dielectric change detection means located a predetermined distance down stream from said injecting means, an indicator having means for connecting and disconnecting same from said meter, means for actuating said timing means to inject said slug and simultaneously for energizing said connecting means, and means responsive to said dielectric detection means for energizing said disconnecting means to determine the meter reading corresponding to the flow of a predetermined known quantity of fluid through said meter.

6. A system for calibrating a large capacity fluid flow meter connected to a pipe line comprising means for injecting into said pipe line a slug of miscible fluid having a dielectric constant measurably different from the dielectric constant of the fluid in said pipe line, said injecting means including means for applying a gas under pressure to said slug fluid, said pressure being much greated than the line pressure of said pipe line, a piston actuated plunger type valve for admitting said slug fluid into the pipe line, said valve plunger having a reduced area exposed to said slug fluid when the valve is closed, means for applying said gas under pressure to said valve piston to hold the valve closed means for venting said gas under pressure from application to said valve piston in order to rapidly open said valve, timing means for determining the duration of the open condition of said valve to allow said slug of fluid only to enter said pipe line, means actuated by said timing means for controlling the application and venting of said gas under pressure in order to control the position of said valve, said elements being so constructed and arranged that said slug has a volume equal to the volume of a short length of said pipe line on the order of a few diameters, dielectric change detection means located a predetermined distance down stream from said injecting means, an indicator having means for connecting and disconnecting same from said meter, means for actuating said timing means to inject said slug and simultaneously for energizing said connecting means, and means responsive to said dielectric detection means for energizing said disconnecting means to determine the meter reading corresponding to the flow of a predetermined known quantity of fluid through said meter.

References Cited in the file of this patent
UNITED STATES PATENTS

| | | |
|---|---|---|
| 2,631,242 | Metcalf | Mar. 10, 1953 |
| 2,739,476 | Atkins | Mar. 27, 1956 |
| 2,772,561 | Plank et al. | Dec. 4, 1956 |